(12) United States Patent
Shahamat et al.

(10) Patent No.: US 8,556,518 B2
(45) Date of Patent: Oct. 15, 2013

(54) FLANGED BEARING SUPPORT ARRANGEMENT

(75) Inventors: Mohammad Shahamat, Rockton, IL (US); Timothy R. Welch, Roscoe, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 266 days.

(21) Appl. No.: 13/108,036

(22) Filed: May 16, 2011

(65) Prior Publication Data

US 2012/0294559 A1 Nov. 22, 2012

(51) Int. Cl.
*F16C 19/52* (2006.01)
(52) U.S. Cl.
USPC ............ 384/493; 384/515; 384/542; 384/905
(58) Field of Classification Search
USPC ......... 384/493, 510, 513, 515, 537, 542, 557, 384/562, 585, 905
See application file for complete search history.

(56) References Cited

U.S. PATENT DOCUMENTS

| | | | |
|---|---|---|---|
| 3,317,258 A * | 5/1967 | Hermann | 384/557 |
| 3,918,277 A | 11/1975 | Nakk | |
| 4,226,485 A * | 10/1980 | Pruvot | 384/557 |
| 4,473,309 A | 9/1984 | Box | |
| 4,623,810 A | 11/1986 | Smith | |
| 5,073,039 A | 12/1991 | Shervington | |
| 5,249,869 A | 10/1993 | Mabe | |
| 5,577,847 A | 11/1996 | Nakamura et al. | |
| 5,689,994 A | 11/1997 | Nagai et al. | |
| 5,785,431 A | 7/1998 | Nilsson et al. | |
| 6,027,251 A * | 2/2000 | Tsai | 384/126 |
| 6,135,641 A | 10/2000 | Smith | |
| 6,357,923 B1 | 3/2002 | Sato et al. | |
| 7,806,596 B2 | 10/2010 | Shatz et al. | |
| 8,052,331 B2 * | 11/2011 | Katougi et al. | 384/537 |
| 2010/0195948 A1 | 8/2010 | Perkinson et al. | |

\* cited by examiner

*Primary Examiner* — Thomas R Hannon
(74) *Attorney, Agent, or Firm* — Carlson, Gaskey & Olds P.C.

(57) ABSTRACT

An example bearing support arrangement includes a support and a race of bearing assembly. A flange extends radially from the race. The flange and the support are configured to be held against a housing to secure the bearing assembly relative to the housing.

18 Claims, 4 Drawing Sheets

FLANGED BEARING SUPPORT ARRANGEMENT

BACKGROUND

This disclosure relates generally to a bearing assembly and, more particularly, to a bearing assembly support arrangement that accommodates thermal expansion and contraction of the bearing assembly and supporting components.

Bearing assemblies are well known and used in many environments. Some bearing assemblies are used to support rotatable shafts. In one example, the rotatable shaft is a generator rotor shaft that is selectively rotated by a turbomachine to drive an aircraft generator. When driven, the aircraft generator produces electric power that is supplied to various components.

Bearing assemblies are often supported by relatively lightweight housing materials, particularly in aircraft environments. The lightweight housing materials typically have a greater coefficient of thermal expansion than the materials of the bearing assembly. Accordingly, the housing may contract on the bearing assembly in cold environments, which can cause binding in the bearing assembly. In warmer environments, the housing may expand away from the bearing assembly, which can cause looseness in the bearing assembly. Supports have been used to mitigate these thermal expansion differences, but the bearing assemblies still experience binding and looseness even with the supports.

FIG. 1 shows a prior art bearing support arrangement having a bearing assembly 10 and housing 12. A support 14 is pressed into a liner 16 which is pressed into recess 17 within the housing 12. A radially facing surface 18 of the support 14 directly contacts an outer bearing race 19 of the bearing assembly 10. In this prior art arrangement, the outer bearing race 19 of the bearing assembly 10 is clamped axially between a retainer 20 and a support portion 22 of the support 14. The retainer 20 applies an axial force in a direction A directly to at least the outer race. Even though the prior art arrangement of FIG. 1 includes the support 14, the bearing assembly 10 still may bind and become loose as the housing 12 contracts and expands relative to the bearing assembly 10.

SUMMARY

An example bearing support arrangement includes a support and a race of bearing assembly. A flange extends radially from the race. The flange and the support are configured to be held against a housing to secure the bearing assembly relative to the housing.

An example generator rotor shaft bearing support assembly includes a retaining ring and an outer race of a bearing assembly. The outer race has a radially extending flange. The assembly also includes a support and a housing. The radially extending flange and the support are held between the retaining ring and the housing.

An example bearing assembly supporting method includes positioning a bearing assembly within an opening established by a support and clamping a flange of the bearing assembly to support the bearing assembly. The flange extends radially from a race of the bearing assembly. The method includes supporting a rotatable shaft with the bearing assembly.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 2:
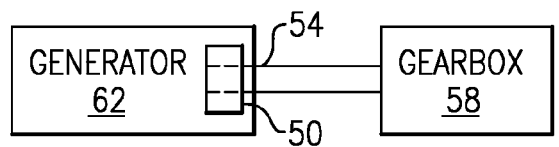
FIG. 2 shows a highly schematic view of a bearing assembly supporting a generator input shaft.

Referring to FIG. 2, an example bearing support arrangement 50 is configured to rotatably support a rotor shaft 54. In this example, the shaft 54 rotatably connects a gearbox 58 to a generator 62. A turbomachine provides a rotating input to the example gearbox 58, which then rotates the shaft 54 to drive the generator 62.

Figure 1:
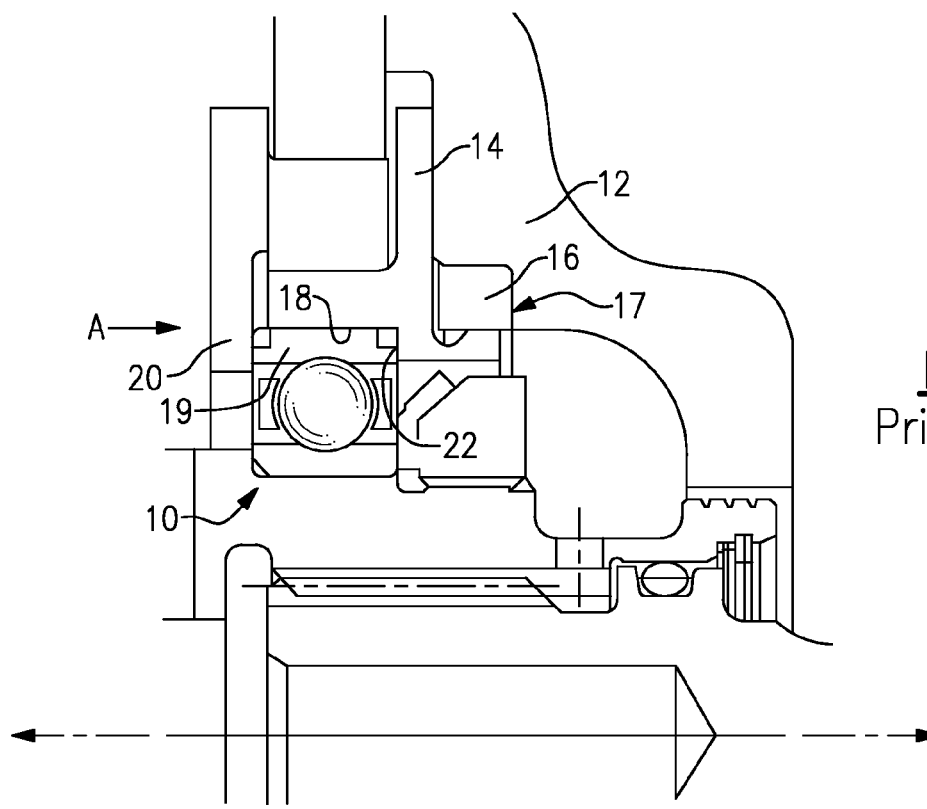
FIG. 1 shows a prior art bearing support arrangement.
Figure 4:
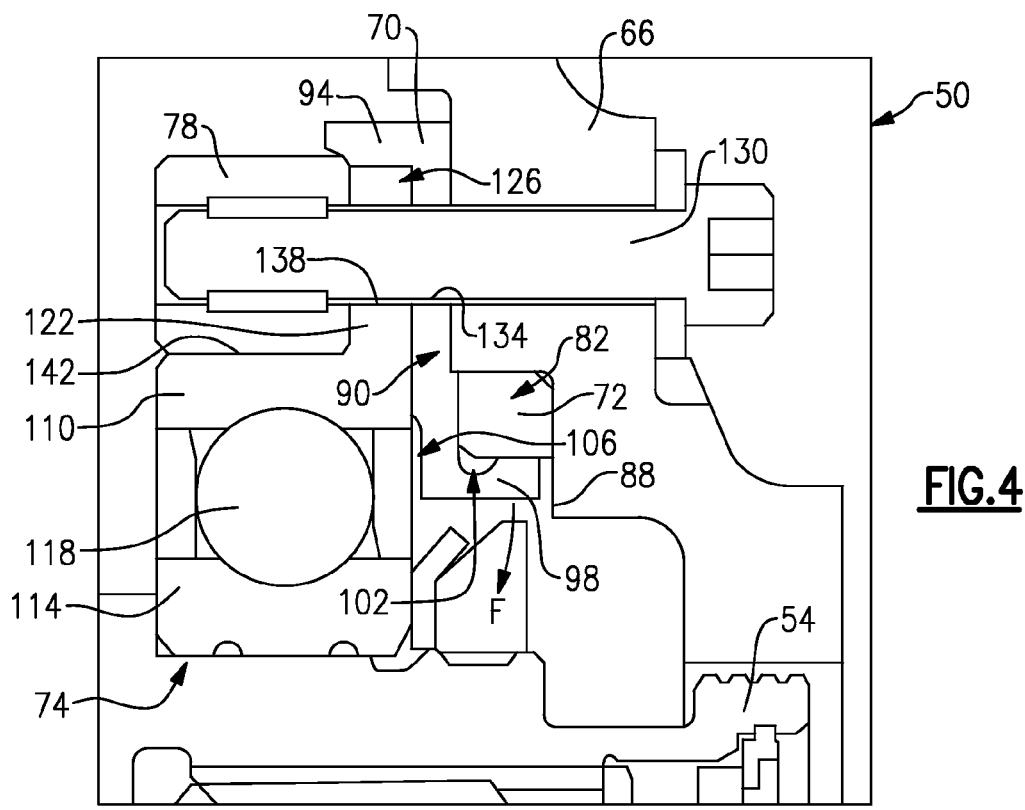
FIG. 4 shows a close-up view of a selected portion of FIG. 3.
Figure 3:
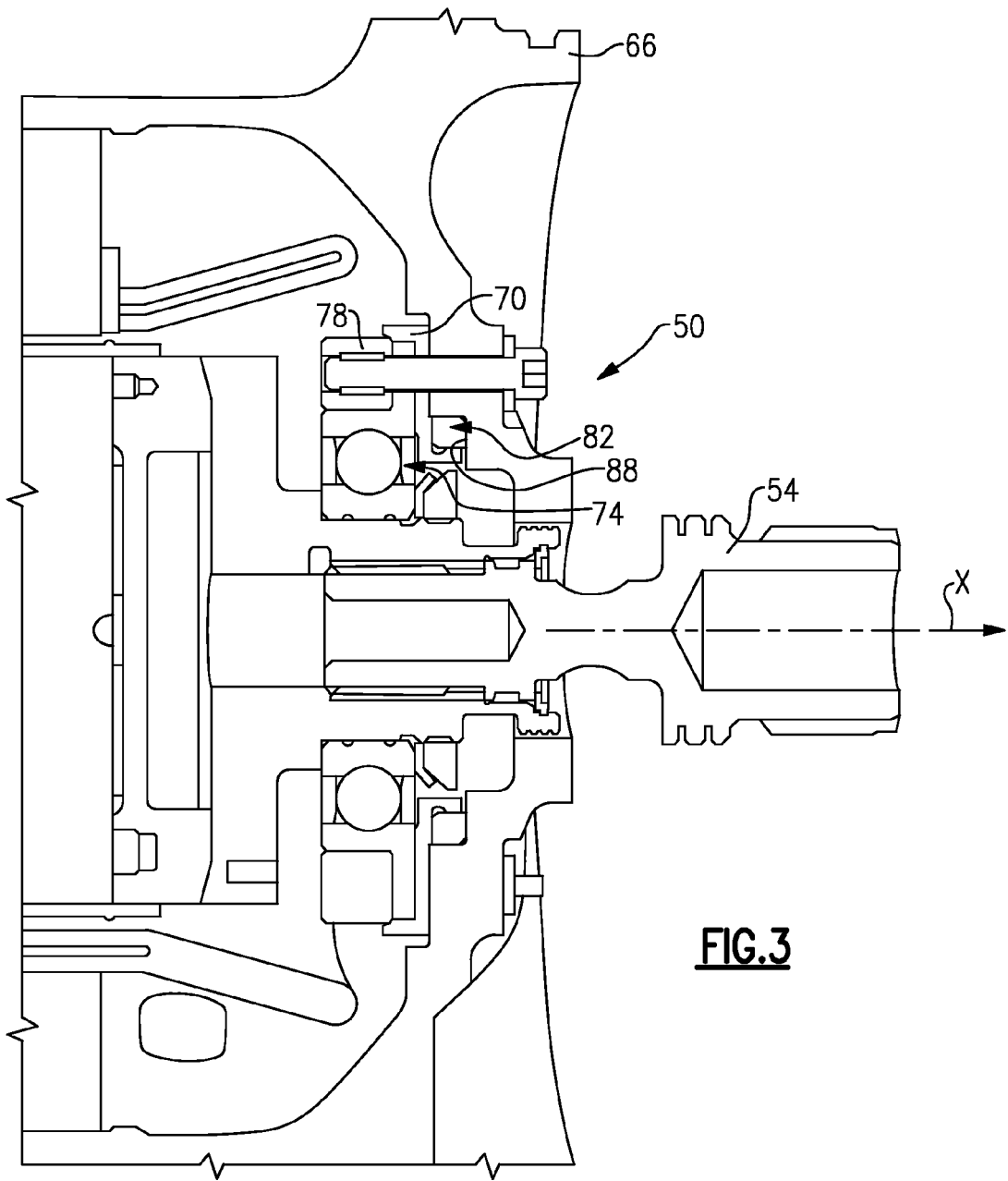
FIG. 3 shows a cutaway view of a bearing support arrangement for supporting the FIG. 2 bearing assembly.
Figure 5:
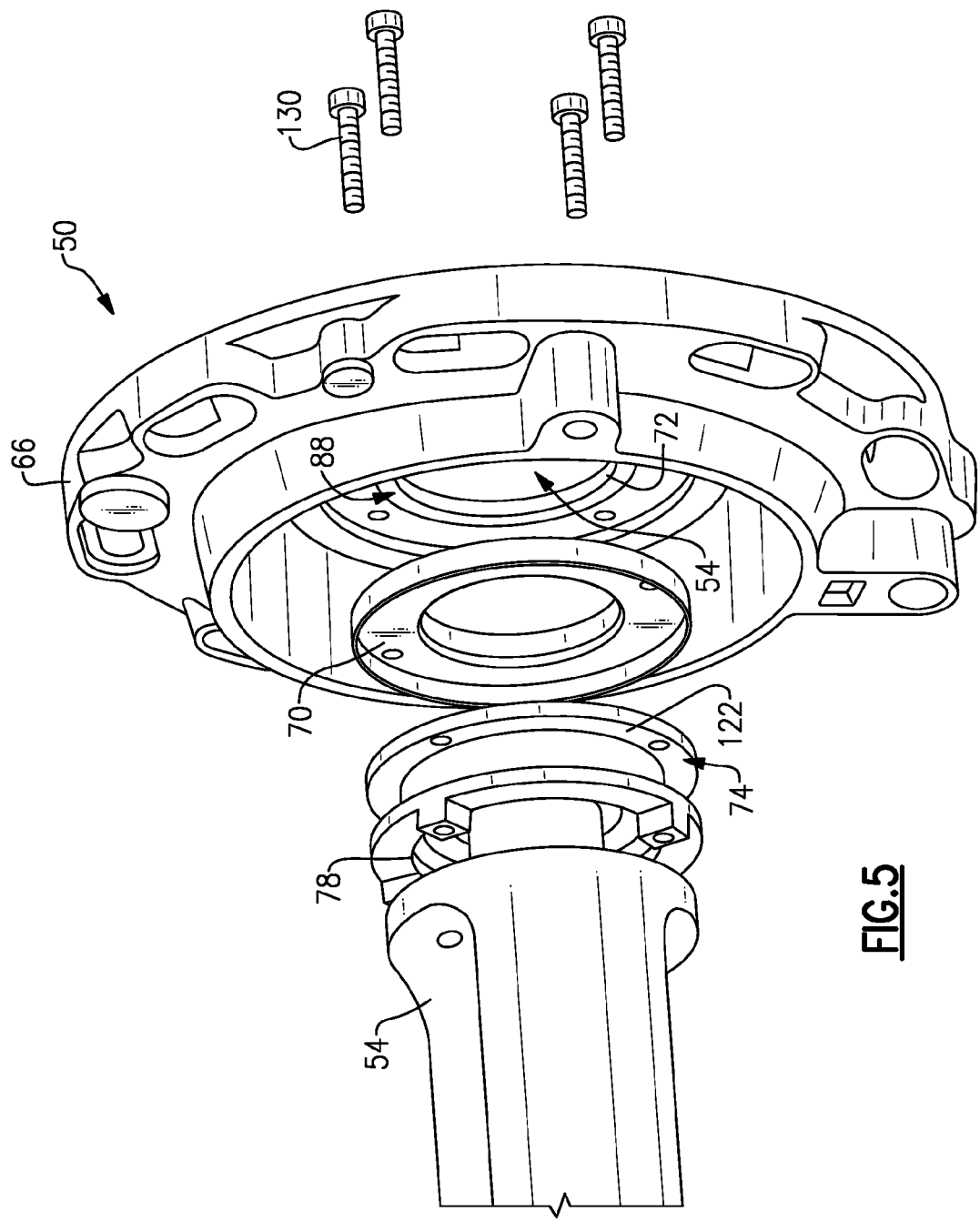
FIG. 5 shows an exploded view of selected portions of FIG. 3.

Referring to FIGS. 3-5, the example bearing support arrangement 50 includes a housing 66, a support 70, a liner 72, a bearing assembly 74, and a retainer 78.

The example housing 66 establishes an opening 82 or bore. In this example, the liner 72 is press-fit into a stepped area 88 of the housing 66 during assembly of the bearing support arrangement 50. That is, the diameter of the liner 72 is slightly larger than the diameter of the bore area 82, and inserting the liner 72 into the bore area 82 compresses the liner 72 radially to hold the position of the liner 72. A person having skill in this art and the benefit of this disclosure would understand how to establish such a press-fit.

As can be appreciated, the stepped area 88 defines a depth of the opening 82. After the liner 72 is in position, the inside diameter of the liner 72 may be machined to establish the proper dimension. After the machining of the liner 72, a portion of the support 70 is press-fit into the liner 72. The shaft 54 also extends through the opening 82.

The example support 70 includes a mid-portion 90 that extends radially relative to an axis of rotation X of the shaft 54. A first axially extending portion 94 extends from a radially outer end of the mid-portion 90. A second axially extending portion 98 extends from a radially inner end of the mid-portion 90. The first axially extending portion 94 extends from the mid-portion 90 in an opposite direction from the direction that the second axially extending portion 98 extends from the mid-portion 90.

In this example, the second axially extending portion 98 is the portion of the support 70 that is press-fit into the liner 72. In this position, the second axially extending portion 98 directly contacts an inwardly facing surface of the liner 72. The second axially extending portion 98 includes an undercut 102, which encourages flexing movement of the second axially extending portion 98 relative to the mid-portion 90. The second axially extending portion 98 may flex in a direction F during installation, and during a cold operating condition when the housing 66 is constricting inwardly toward the axis X. The support 70 is also notched in an area 106. As the second axially extending portion 98 flexes in the direction F, the area 106 provides clearance for the second axially extending portion 98 to move relative to the bearing assembly 74.

The example bearing assembly 74 includes an outer bearing race 110, an inner bearing race 114, and ball bearings 118. Other example bearing assemblies may include bearings other than ball bearings. A radially extending flange 122 extends from the outer bearing race 110 in a radially outward direction. The radially extending flange 122 supports the bearing assembly 74. The bearing assembly 74 rotatably supports the shaft 54 in a known manner.

In this example, the bearing assembly 74 is made of steel, such as an M50 steel. Also, the support 70 is made of a carbon steel, the liner 72 is a metallic material, and the housing 66 is a relatively light-weight housing made of magnesium or aluminum. As can be appreciated, the bearing assembly 74 and the housing 66 have different coefficients of thermal expansion. The coefficient of thermal expansion of the liner 72 is between the coefficient of thermal expansion of the support 70 and the housing 66.

In this example, the first axially extending portion 94 of the support 70 establishes a stepped area 126 that receives the bearing assembly 74. The radially extending flange 122 extends from the outer bearing race 110 to contact the first axially extending portion 94, which helps radially and axially locate the bearing assembly 74 during assembly.

In this example, one of a plurality of mechanical fasteners 130 extends from the housing 66 to the retainer 78. The mechanical fastener 130 extends through an aperture 134 established in the support 70. The mechanical fastener 130 also extends through an aperture 138 established in the radially extending flange 122 of the bearing assembly 74. As the mechanical fastener is secured, the mechanical fastener 130 pulls the retainer 78 and the housing 66 closer to each other, which clamps the radially extending flange 122 and the support 70 between the retainer 78 and the housing 66. This clamping force holds the position of radially extending flange 122 of the bearing assembly 74 and mid-portion 90 of the support 70 during operation and rotation of the shaft 54.

Components surrounding the bearing assembly 74 accommodate movement of the bearing assembly 74 during temperature fluctuations. For example, an outwardly facing surface 142 of the outer bearing race 110 may be spaced slightly from the retainer 78 to accommodate movement of the outer bearing race 110 and other portions of the bearing assembly 74 during changes in size of the bearing assembly 74 due to thermal expansion and contraction. In addition, the area 106 spaces the support 70 slightly from the bearing assembly 74. Because the bearing assembly 74 is supported primarily through the radially extending flange 122, the bearing assembly 74 does not experience clamping loads that may significantly bind or loosen the bearing assembly 74 during temperature fluctuations. The support 70, the radially extending flange 122, and the housing 66 remain in contact throughout the operating temperature range In this example, the mechanical fastener 130 is a bolt and washer assembly that is threadably received within the retainer 78. Other examples may include other types of mechanical fasteners 130, or other methods of clamping the radially extending flange 122.

Figure 6:
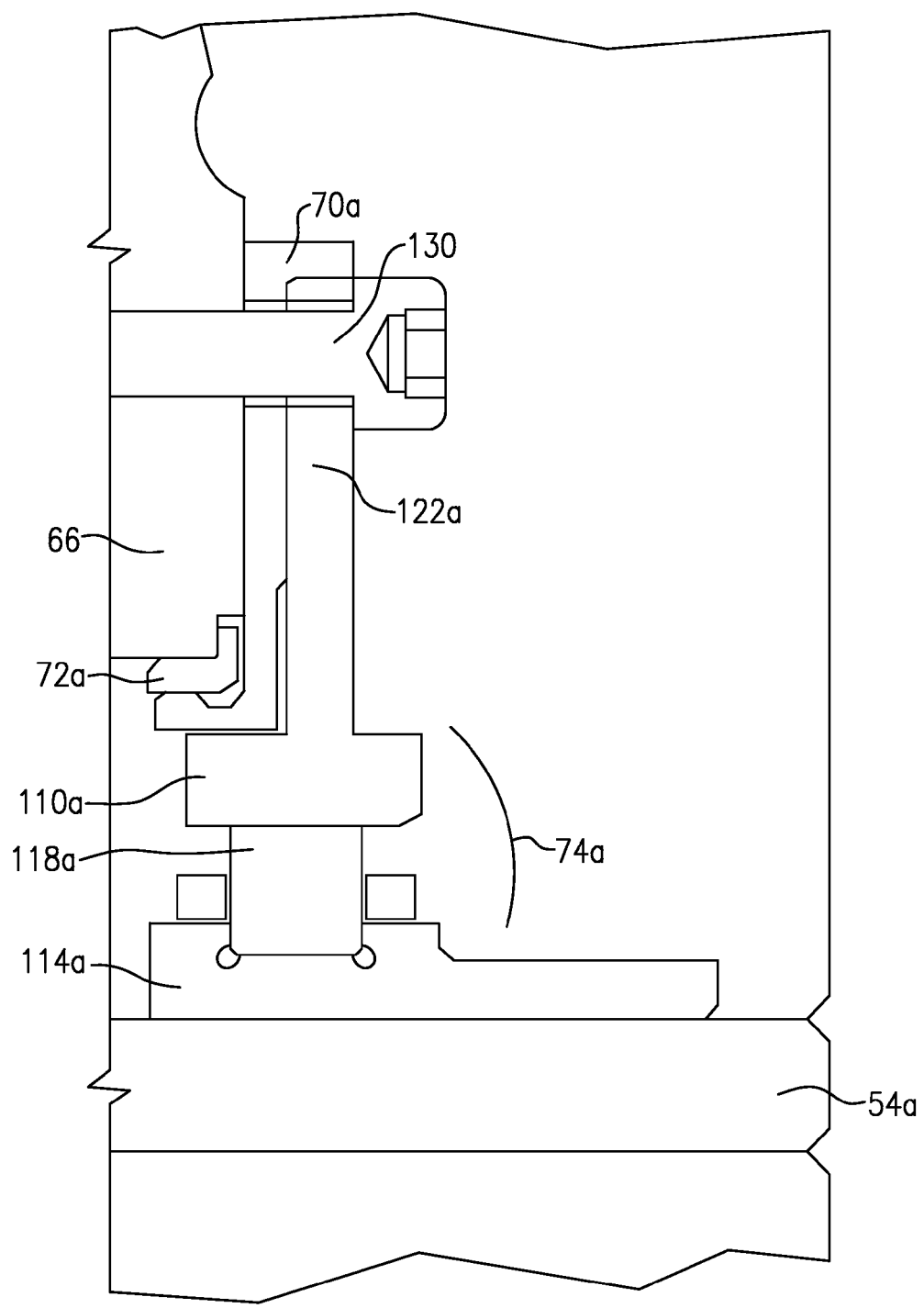
FIG. 6 shows another example bearing support arrangement.

Referring to FIG. 6, another example bearing support arrangement rotatably supports a rotor shaft 54a and includes a bearing assembly 74a having a roller bearing 118a held between an outer bearing race 110a and an inner race 114a. A radially extending flange 122a extends from the outer bearing race 110a. The radially extending flange 122a is clamped against the housing 66 with the mechanical fastener 130. The bearing support arrangement of FIG. 6 further includes a support 70a and a liner 72a.

In this example, the radially extending flange 122a extends from an axial middle area of the outer bearing race 110a. The radially extending flange 122 (FIG. 4) extends from an axial end of the outer bearing race 110. Also, in other examples, the radially extending flange 122 and the radially extending flange 122a may extend at an angle relative to the axis X. That is, the flanges 122 and 122a may extend in a direction having both a radial and axial component in some examples.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:
1. A bearing support arrangement, comprising:
a support;
a race of a bearing assembly; and
a flange extending radially from the race, the flange and the support configured to be held against a housing to secure the bearing assembly relative to the housing,
wherein the support defines a support aperture and the flange defines a flange aperture, and the support aperture and the flange aperture are configured to receive a mechanical fastener.

2. The bearing support arrangement of claim 1, wherein the race is a radially outer race of the bearing assembly.

3. The bearing support arrangement of claim 1, wherein the support and the housing have different coefficients of thermal expansion.

4. The bearing support arrangement of claim 1, wherein the support comprises a carbon steel.

5. The bearing support arrangement of claim 1, wherein at least a portion of the support is configured to be press-fit within a liner.

6. The bearing support arrangement of claim 5, wherein the liner is configured to be press-fit into a stepped area of the housing.

7. The bearing support arrangement of claim 1, wherein the support comprises a radially extending mid-portion, a first axially extending portion extending from a radially inner end of the mid-portion, and a second axially extending portion extending from a radially outer end of the mid-portion.

8. The bearing support arrangement of claim 7, wherein the first axially extending portion extends from the mid-portion in a first direction, and the second axially extending portion extends from the mid-portion in a second direction that is opposite the first direction.

9. The bearing support arrangement of claim 7, wherein the first radially extending portion is configured to be received within an aperture defined by a liner that directly contacts the housing.

10. The bearing support arrangement of claim 1, further comprising a ball bearing held by the race.

11. The bearing support arrangement of claim 1, further comprising a retainer, and a mechanical fastener that is configured to hold the position of the retainer relative to the housing to clamp the support and the flange between the retainer and the housing.

12. A generator rotor shaft bearing support assembly, comprising:
a retaining ring;
an outer race of a bearing assembly, the outer race having a radially extending flange;
a support; and
a housing, wherein at least a portion of the radially extending flange and at least a portion of the support are held between the retaining ring and the housing.

13. The generator rotor shaft bearing support assembly of claim 12, wherein the radially extending flange extends from an axial end of the outer race.

14. The generator rotor shaft bearing support assembly of claim 12, wherein the radially extending flange and the support each establish a plurality of apertures that are each configured to receive a mechanical fastener extends from the retaining ring to the housing, the mechanical fastener biasing the retaining ring and the housing toward each other to clamp the flange and the support between the retaining ring and the housing.

15. A generator rotor shaft bearing support assembly of claim 14, wherein the mechanical fastener is a threaded fastener.

16. The generator rotor shaft bearing support assembly of claim 12, wherein the support comprises a radially extending mid-portion, a first axially extending portion extending from a radially inner end of the mid-portion, and a second axially extending portion extending from a radially outer end of the mid-portion, the first axially extending portion extending from the mid-portion in a first direction, and the second axially extending portion extending from the mid-portion in a second direction that is opposite the first direction.

17. The generator rotor shaft bearing support assembly of claim 12, wherein the bearing assembly rotatably supports a rotor shaft.

18. A bearing assembly supporting method, comprising:
 positioning a bearing assembly within an opening established by a support;
 clamping a flange of the bearing assembly to support the bearing assembly, the flange extending radially from a race of the bearing assembly;
 supporting a rotatable shaft with the bearing assembly; and
 including press-fitting the support into an opening established by a liner.

* * * * *